US007570949B1

(12) United States Patent
Minerath

(10) Patent No.: US 7,570,949 B1
(45) Date of Patent: Aug. 4, 2009

(54) AUTOMATIC ANTENNA SELECTOR SWITCH

(75) Inventor: David J Minerath, Madison, WI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 558 days.

(21) Appl. No.: 11/404,822

(22) Filed: Apr. 17, 2006

Related U.S. Application Data

(60) Provisional application No. 60/671,497, filed on Apr. 15, 2005.

(51) Int. Cl.
*H04Q 7/20* (2006.01)

(52) U.S. Cl. .................. 455/436; 455/3.02; 455/277.1; 455/277.2; 455/428

(58) Field of Classification Search ................ 455/3.02, 455/272, 575.7, 132, 560, 13.1, 429, 3.04, 455/419, 425, 427, 12.1, 428, 435.2, 436, 455/452.2, 456.6, 464, 8, 10, 13.2, 15, 504, 455/506, 513, 277.1, 277.2
See application file for complete search history.

(56) References Cited

U.S. PATENT DOCUMENTS

| | | | | |
|---|---|---|---|---|
| 4,477,812 | A | 10/1984 | Frisbee, Jr. et al. | |
| 5,410,621 | A * | 4/1995 | Hyatt | 382/260 |
| 6,205,171 | B1 | 3/2001 | Yang et al. | |
| 6,628,235 | B2 | 9/2003 | Wight | |
| 6,771,057 | B1 | 8/2004 | Raddant | |
| 6,788,957 | B1 | 9/2004 | Recouly et al. | |
| 2003/0073404 | A1* | 4/2003 | Sauvageot et al. | 455/13.1 |
| 2004/0170219 | A1 | 9/2004 | Sasaki et al. | |
| 2005/0064825 | A1 | 3/2005 | Forrester | |
| 2005/0245224 | A1* | 11/2005 | Kurioka | 455/272 |
| 2007/0225039 | A1* | 9/2007 | Friday et al. | 455/560 |

* cited by examiner

*Primary Examiner*—Tan Trinh
(74) *Attorney, Agent, or Firm*—John J. Karasek; J. George Legg

(57) ABSTRACT

A shipboard communications system for providing RF communications between a ship and a communications satellite includes a modem, an antenna selector switch coupled to the modem and to a pair of directional antennas, a programmable controller for each antenna, and an antenna selector logic (ASL) circuit coupled to each antenna's programmable controller responsive to the programmable controller whereby an antenna handoff occurs when an on-service antenna is moving into a blockage zone and does not occur only when an off-service antenna is coming out of blockage.

2 Claims, 4 Drawing Sheets

AUTOMATIC ANTENNA SELECTOR SWITCH

CROSS-REFERENCE TO RELATED APPLICATIONS

This Application is a Non-Prov of Prov (35 USC 119(e)) application 60/671,497 filed on Apr. 15, 2005, incorporated herein by reference.

FIELD OF THE INVENTION

The present invention relates to an antenna selector switch, and more particularly, to an automatic antenna selector switch for a shipboard satellite communications system.

BACKGROUND OF THE INVENTION

In a shipboard environment, placing a directional satellite antenna in a position to have a clear view of the sky in all directions is difficult. In some cases, large portions of the sky are blocked from the antenna's view by various obstructions (shipboard cranes, superstructure, etc.) necessitating the use of multiple antennas to ensure a clear view of the satellite at any heading.

There are several points at which the signal/data path can be split into the multiple paths. One such point is at the intermediate frequency (IF) level, between a single satellite modem and multiple transmit/receive paths. The signal path is shifted, either automatically or manually, from one path to another, much like a railroad switch shifts between sections of track.

The simplest means of shifting from one antenna to another is through the use of a mechanical switch. One consequence of mechanically shifting between antennas is that the signal, and hence the data stream, is briefly interrupted when the transition is made from one antenna to another. As with any mechanical device, there is a finite length of time when the switch is between two states. This "in between time" is rather long in comparison to the signal period of the signal being switched.

One way of mitigating this interruption in the signal is through the use of buffers, either internal or external to the modem. In either case, the ability to empty the transmitting buffer and fill the receiving buffer requires the use of additional bandwidth on the physical layer or throttling back the data rate to the transmitting modem. In the case where the buffering is internal to the modem, this solution is highly proprietary, specific to a particular modem pair. External buffering independent of the satellite modem is possible. This would require complex external electronics, most likely microprocessor-based, to manage the bandwidth available between the serial device and the satellite modem.

Another solution is to maintain the connection between the two antennas continuously. The use of multiple antennas concurrently is difficult due to differences in path length resulting in phase differences in the incoming signals. In some cases, phase-shifting circuitry is used to phase-shift the incoming signals to correct for differences in signal path length and prevent out-of-phase conditions from degrading the resulting signal. Such phase-shifting circuitry can be costly in terms of expense and complexity.

Another solution illustrated in FIG. 1. In this configuration, the availability of only one antenna is used as the selection criteria for an antenna handoff. One antenna controller controls an electronic "a/b" switch which selects which antenna to use. This causes handoffs to occur unnecessarily, such as when antenna "a" comes out of a programmed blockage sector. In this scenario, the switches would shift back to antenna "a" even if antenna "b" still had a clear view of the satellite.

BRIEF SUMMARY OF THE INVENTION

According to the invention, a shipboard communications system for providing RF communications between a ship and a communications satellite includes a modem, an antenna selector switch coupled to the modem and to a pair of directional antennas, a programmable controller for each antenna, and an antenna selector logic (ASL) circuit coupled to each antenna's programmable controller responsive to the programmable controller whereby an antenna handoff occurs when an on-service antenna is moving into a blockage zone and does not occur only when an off-service antenna is coming out of blockage.

Perhaps the greatest advantage of the antenna selector switch is that it is designed to operate at the IF level independent of the type of modem used; this eliminates the requirement for a proprietary type of modem for each end of the satellite link. Additionally, it requires no extra overhead bandwidth for buffer filling/purging.

This switch does not require complex and costly phase-matching circuitry. Using the Sea Tel® DAC-97 antenna control unit (ACU) as an example, the blockage zones programmed into the controller will serve as the trigger for initiating a handoff. The switch initiates a handoff only when the on-service antenna is about to become unavailable as signaled by the antenna controller associated with that antenna. By selecting the proper blockage zone boundaries, the antenna handoff will be performed when the antennas are approximately the same distance away from the satellite. This allows pre-existing hardware capabilities to be used for handoff control. The invention uses logic to prevent unnecessary handoffs. A handoff will occur only when an antenna is entering a programmed blockage zone, preventing unnecessary handoffs when both antennas have a clear view of the satellite.

To further simplify the switch design, the built-in error correction methods found in most (if not all) satellite modems is used to mitigate the few errors that may be introduced in an antenna handoff. This error correction is not a proprietary technique; it's a well-known mathematical method of detecting and correcting errors in a data stream. The programmed blockage zones simply minimize the errors caused by different path lengths from the modem to each antenna. In addition, high-speed solid-state switches are used in the design to prevent noise spikes that may occur when switching a mechanical switch, and to make the switching action as fast as possible.

DETAILED DESCRIPTION OF THE INVENTION

Figure 1:
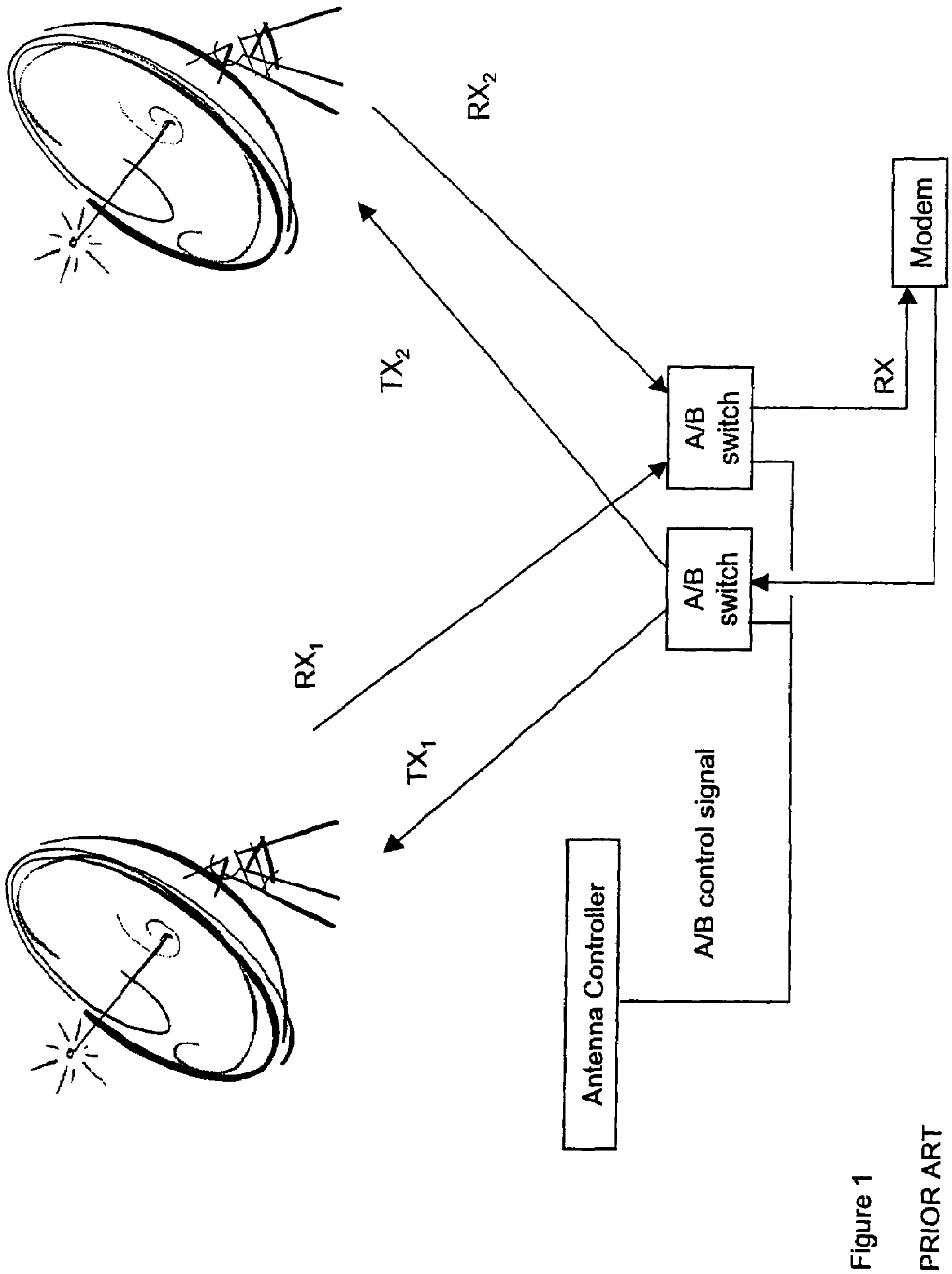
Figure 1 PRIOR ART
FIG. 1 is a schematic diagram of a conventional shipboard satellite communications system.
Figure 2:
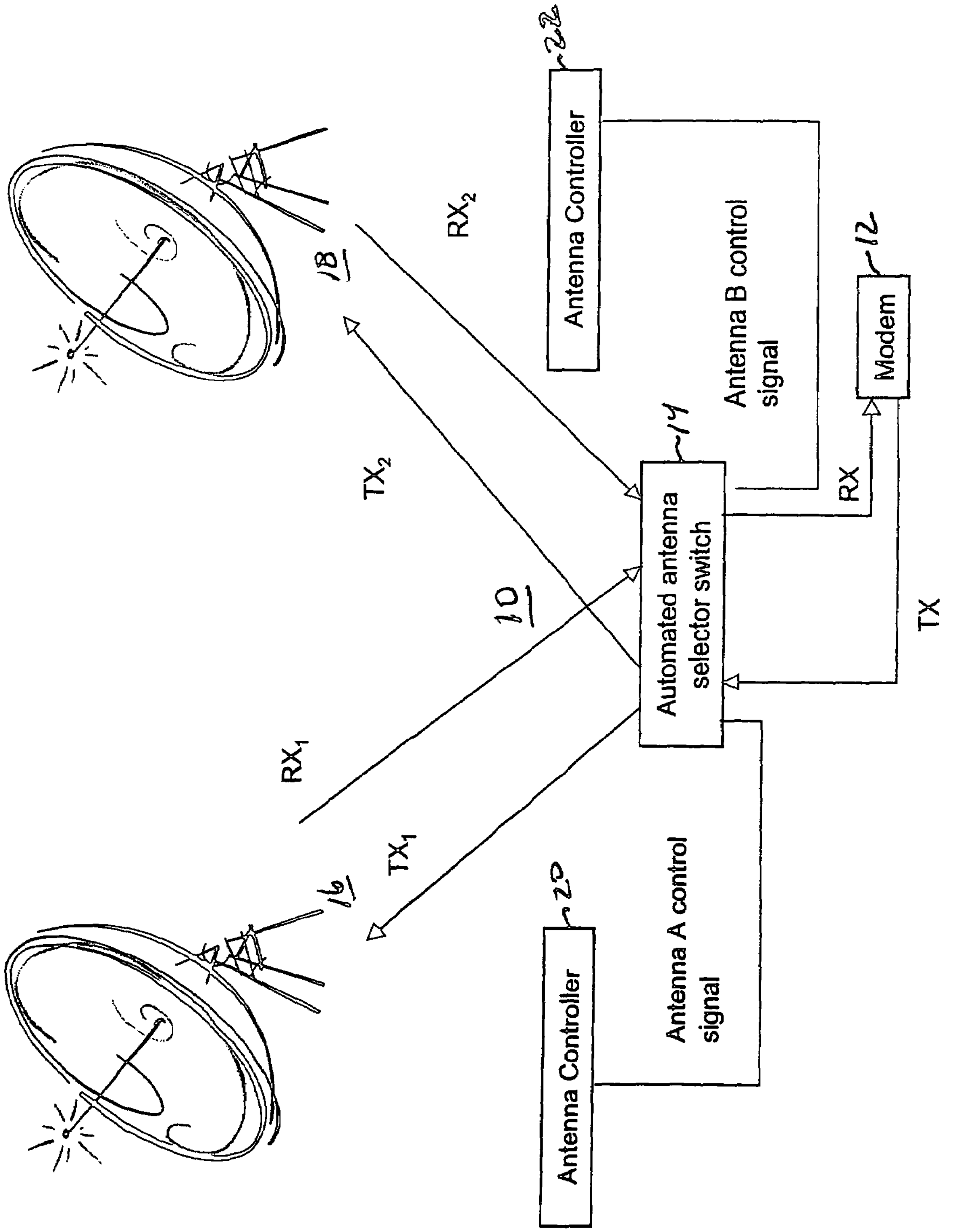
FIG. 2 is a schematic block diagram of a satellite communications system in accordance with the invention.

Referring now to FIG. 2, a shipboard communications system 10 includes a satellite modem 12 with the transmit and receive IF signals connected to one side of automatic antenna selector switch 14, which on its other side is connected to two antennas 16 and 18. Switch 14 is independent of the satellite modem 12 and operates at the IF level of the transmit/receive chain. Switch 14 is controlled by programmable antenna controllers 20 and 22 that in a preferred embodiment are programmed based on the ship's heading, the input of which is provided by a shipboard navigation system, e.g. a ship gyro compass.

Switch 14 preferably also includes a manual setting to allow for direct operator control of the antenna selection. Switch 14 then operates in two basic modes, manual and automatic. In the manual mode, the operator selects one antenna as the in-use unit, routing the transmitted and received signals to and from that particular antenna. The other antenna is allowed to idle, with the data signals electrically isolated from it.

Figure 3:
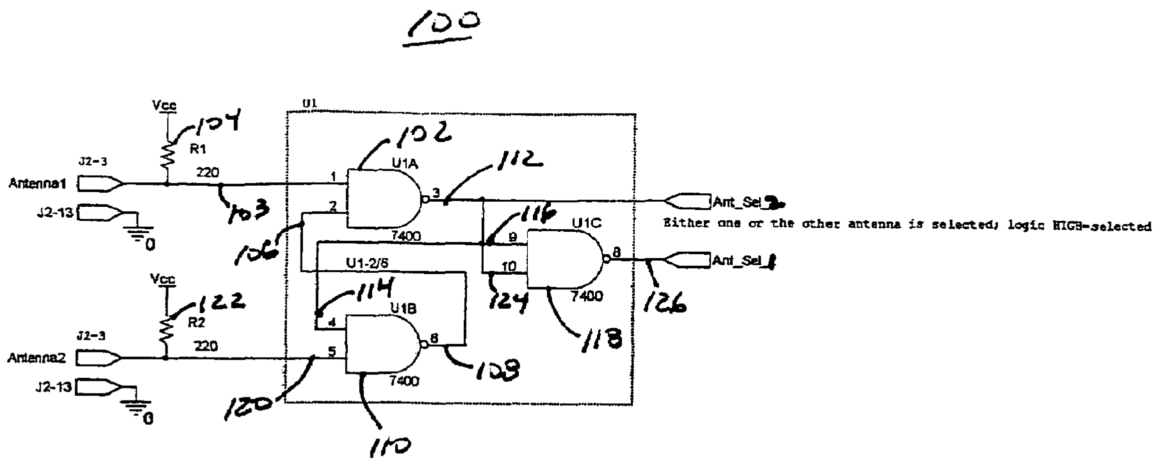
FIG. 3 is a schematic circuit diagram of an automatic antenna logic circuit (ASL) in accordance with the invention.
Figure 4:
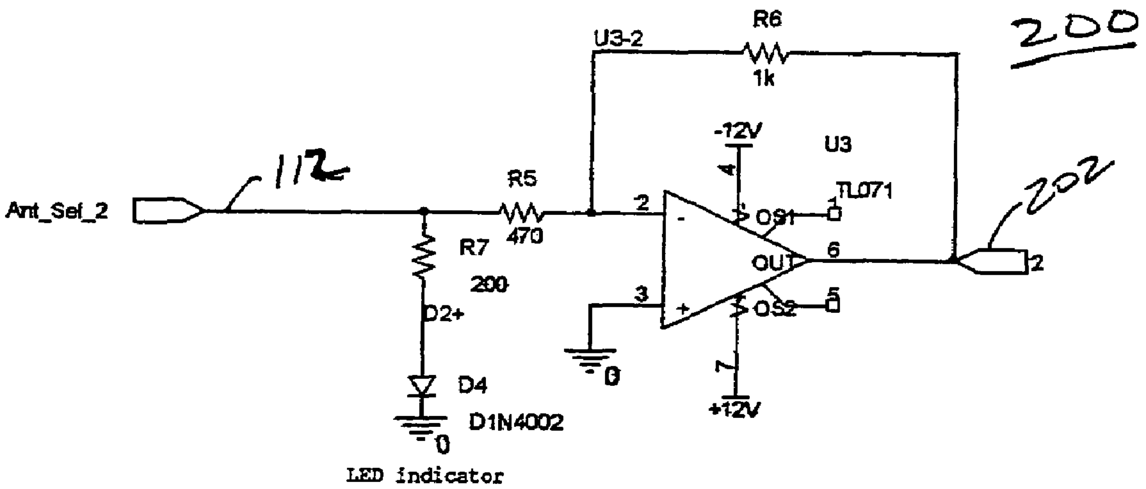
FIG. 4 is a schematic circuit diagram of a switch driver circuit in accordance with the invention.

Switch 14 includes a pair of high-speed diode switches (not illustrated) responsive to a logic state set by an antenna selector logic circuit (ASL) 100. Referring now to FIG. 3, ASL circuit 100 includes a first NAND gate 102, having a first Antenna1 input 103 coupled to a pull-up resistor 104, a second input 106 coupled to the output 108 of a second NAND gate 110, and an output 112 (Ant_Sel_1). NAND gate 110 has a first input 114 coupled to a first input 116 (9) of an inverter 118 and a second Antenna2 input 120 coupled to a pull-up resistor 122. Inverter 118 has a second input 124 coupled to the output 112 of NAND gate 102 and an output 126 (Ant_Sel_2).

In automatic mode, ASL circuit 100 selects the antenna to use based on two signal inputs. While both antennas may be available for use, only one is allowed to be used at any given time. For the purposes of this description, it will be assumed that antenna 16 is available for use and antenna 18 is blocked.

Antenna Selector Logic (ASL)

Description

The Antenna Selector Logic determines which antenna is to be used, based on current state and inputs. Table 1 shows the truth table for the selector logic. A logic '0' indicates that the antenna is blocked and not available; a logic '1' indicates that the antenna is not blocked. Having both antenna inputs as logic '0' is not allowed, since this indicates that both antennas are blocked. This condition is generally not allowed. If this case does exist, it is not important which antenna is selected since neither one is available.

TABLE 1

Antenna Selector Logic Truth Table

| Antenna Inputs | | Current State | New State |
|---|---|---|---|
| Antenna1 | Antenna2 | Ant_Sel_1 | Ant_Sel_1 |
| 0 | 0 | 0 | xxx |
| 0 | 0 | 1 | xxx |
| 0 | 1 | 0 | 0 |
| 0 | 1 | 1 | 0 |
| 1 | 0 | 0 | 1 |
| 1 | 0 | 1 | 1 |
| 1 | 1 | 0 | 0 |
| 1 | 1 | 1 | 1 |

xxx = don't care; input combination not allowed

Since only one antenna can be used at a time, the Ant_Sel_2 is always set to the logic opposite of Ant_Sel_1. NAND gate U1C is connected to act as an inverter 118.

The goal of the truth table is to prevent unnecessary antenna handoffs. To do this, the criteria for performing an antenna handoff is that a handoff occurs when the on-service antenna is moving into a blockage zone. Having an off-service antenna come out of blockage will not cause the IF path to shift unnecessarily.

The input signals are as follows:

ANTENNA AVAILABLE:

Terminal Antenna1 input 103 J2-3 is allowed to float to Vcc (+5 VDC) by the external input circuitry and resistor 104. This logic HIGH is applied to NAND gate 102 via input 103 (pin U1-1).

ANTENNA BLOCKED/NOT AVAILABLE:

Terminal Antenna2 input 120 (J2-3) is grounded by the external input circuitry. This logic LOW is applied to NAND gate 110 through input 120 (pin U1-5).

Circuit Response:

NAND gate 110 has a logic HIGH output due to the logic LOW input on input 120. This logic HIGH combined with the logic HIGH on input 103 causes a logic LOW output on NAND gate 102. This logic LOW is applied to input 114 on NAND gate 110. As there can be only one antenna selected at any time, the logic output 112 of NAND gate 102 is inverted by NAND gate 118 connected as an inverter.

If the inputs to the ASL circuit 100 are reversed, circuit operation is also reversed.

If the two input signals are both allowed to float HIGH, the circuit output will not change state. This is designed to prevent the unnecessary switching of antenna signal paths.

The external input is applied to Antenna1 and Antenna2. With an open-circuit input on Antenna1 and/or Antenna2, U1-1 and U1-5 will have 5 VDC applied via pull-up resistors 104 and/or 122 respectively. A grounded input will sink approximately 25 mA through resistors 104 and 122. These logic levels are combined with Ant_Sel_1 in U1 to determine the new state of Ant_Sel_1. U1C inverts Ant_Sel_1 for use as Ant_Sel_2. This ensures that only one antenna is selected at a time.

Switch Driver

A switch driver 200 is coupled to each of output 112 (Ant_Sel_2) and 126 (Ant_Sel_1), with that for output 112 illustrated. Switch driver 200 is an inverting amplifier circuit that in the illustrated embodiment preferably has a gain of approximately −2.1V/V. Each driver 200 is coupled to a high-speed diode switch (not illustrated) in switch 14 via a driver output, output 202 as illustrated for the antenna 1 switch connection. The switch driver 200 converts the TTL logic levels of the ASL 100 to the drive levels required for the IF switches. The handoff switches require two input signals: −8 VDC and 0 VDC. The −8 VDC is applied to the control port associated with the IF signal port to pass through the switch, and the 0 VDC is applied to the control port associated with the IF signal port to block. A logic '1' is converted to −8 VDC and logic '0' is held to 0 VDC. The switch driver circuitry illustrated here is designed to provide the proper inputs to a Mini-Circuits® ZFSWA-2-46 high-speed diode switch (not illustrated).

An LED indicator provides visual indication which antenna is selected by the switch 14.

External Connections

Antenna_1 and Antenna_2 are each connected to an external input such that the inputs are grounded when the associated antenna is blocked and allowed to float when the antenna is not blocked. The ground path must be capable of sinking a 25 mA current. When floating, the potential at the input will be approximately 5 VDC.

Obviously many modifications and variations of the present invention are possible in the light of the above teachings. It is therefore to be understood that the scope of the invention should be determined by referring to the following appended claims.

What is claimed is:

1. A shipboard communications system for providing RF communications between a ship and a communications satellite, comprising:

a modem;

an antenna selector switch coupled to the modem and having a first output and a second output;

a first directional antenna coupled to the first output;

a second directional antenna coupled to the second output;

a programmable controller for each antenna; and an antenna selector logic (ASL) circuit coupled to each antenna's programmable controller responsive to the programmable controller whereby an antenna handoff occurs when an on-service antenna is moving into a blockage zone and does not occur only when an off-service antenna is coming out of blockage, and wherein the ASL circuit comprises a first NAND gate, a second NAND gate, and an inverter, wherein said first NAND gate has a first antenna input coupled to a first pull-up resistor, a second input coupled to an output of a second NAND gate, and a first antenna selector output, said second NAND gate has a first input coupled to a first input of said inverter and a second antenna input coupled to a second pull-up resistor, and said inverter has a second input coupled to the output of said first NAND gate and a second antenna selector output.

2. A shipboard communications system as in claim 1, further comprising a switch driver coupled to the antenna selector switch and responsive to the ASL to position the antenna selector switch in accordance with the ASL logic state.

* * * * *